United States Patent
Erni

(10) Patent No.: US 11,199,287 B1
(45) Date of Patent: Dec. 14, 2021

(54) MULTI-LAYER PIPE TUBING REPAIR SYSTEMS AND METHODS

(71) Applicant: Trinity Bay Equipment Holdings, LLC, Houston, TX (US)

(72) Inventor: Juan Alfredo Erni, Fulshear, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/182,314

(22) Filed: Feb. 23, 2021

(51) Int. Cl.
- *F16L 55/175* (2006.01)
- *F16L 55/168* (2006.01)
- *B29C 73/10* (2006.01)
- *F16L 55/18* (2006.01)

(52) U.S. Cl.
CPC ......... *F16L 55/175* (2013.01); *F16L 55/1683* (2013.01); *B29C 73/10* (2013.01); *F16L 55/18* (2013.01)

(58) Field of Classification Search
CPC ........ B29C 73/10; F16L 55/16; F16L 55/168; F16L 55/1683; F16L 55/1686; F16L 55/175
USPC ............................................. 138/97, 98, 99
See application file for complete search history.

(56) References Cited

U.S. PATENT DOCUMENTS

| | | | | |
|---|---|---|---|---|
| 5,358,994 A | * | 10/1994 | Mallow | C08K 5/005 138/98 |
| 5,632,307 A | * | 5/1997 | Fawley | F16L 55/1686 138/97 |
| 6,491,779 B1 | * | 12/2002 | Bryant | F16L 11/081 156/169 |
| 6,883,835 B2 | | 4/2005 | Krout et al. | |
| 7,534,321 B2 | * | 5/2009 | Fawley | F16L 13/0272 138/97 |
| 2006/0162797 A1 | * | 7/2006 | Boulet D'Auria | F16L 55/175 138/99 |
| 2008/0079260 A1 | | 4/2008 | Duncan | |
| 2009/0038738 A1 | * | 2/2009 | Nakamura | A61B 1/0008 156/94 |
| 2009/0053406 A1 | * | 2/2009 | Ackerman | C09J 7/21 427/142 |
| 2012/0000596 A1 | * | 1/2012 | Walsh | B29C 73/06 156/95 |
| 2012/0132344 A1 | * | 5/2012 | Deleris | B29C 73/10 156/98 |

(Continued)

FOREIGN PATENT DOCUMENTS

WO 2015152726 A1 8/2015

*Primary Examiner* — Robert K Arundale
*Assistant Examiner* — Richard K. Durden
(74) *Attorney, Agent, or Firm* — Conrad J. Hsu

(57) ABSTRACT

Techniques for implementing and/or operating a pipeline system that includes a pipe segment and a pipe repair assembly. The pipe segment includes tubing having an inner barrier layer that defines a pipe bore through the pipe segment, an intermediate layer including solid strip wraps implemented around the inner barrier layer such that gaps are defined between adjacent solid strip wraps, and an outer barrier layer implemented around the intermediate layer. The pipe repair assembly includes an auxiliary patch secured at least across a break in a solid strip wrap in the intermediate layer of the pipe segment that is exposed by a hole in the outer barrier layer of the pipe segment; and outer material disposed over the auxiliary patch via an injection machine to fill the hole in the outer barrier layer of the pipe segment.

17 Claims, 4 Drawing Sheets

(56) References Cited

U.S. PATENT DOCUMENTS

2018/0187818 A1* 7/2018 Mitchell .................. F17D 5/02

* cited by examiner

MULTI-LAYER PIPE TUBING REPAIR SYSTEMS AND METHODS

BACKGROUND

The present disclosure generally relates to pipeline systems and, more particularly, to a pipe repair assembly that may be deployed at a pipe segment in a pipeline system to facilitate repairing damage to the pipe segment.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

In any case, at least in some instances, the tubing of a pipe segment deployed in a pipeline system may become damaged such that its structural integrity is compromised. For example, a hole in the outer barrier layer of the pipe segment tubing may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has integrity-compromising damage may affect (e.g., reduce) operational efficiency and/or operational reliability of the pipeline system, for example, due to the damage resulting in conveyed fluid being lost and/or contaminated by external environmental conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment and a pipe repair assembly. The pipe segment includes tubing having an inner barrier layer that defines a pipe bore through the pipe segment, an intermediate layer including solid strip wraps implemented around the inner barrier layer such that gaps are defined between adjacent solid strip wraps, and an outer barrier layer implemented around the intermediate layer. The pipe repair assembly includes an auxiliary patch secured at least across a break in a solid strip wrap in the intermediate layer of the pipe segment that is exposed by a hole in the outer barrier layer of the pipe segment; and outer material disposed over the auxiliary patch via an injection machine to fill the hole in the outer barrier layer of the pipe segment.

In another embodiment, a method of deploying a pipe repair assembly at pipe segment tubing includes securing an auxiliary patch in the pipe repair assembly across at least a break in a solid strip wrap that is implemented in an annulus of the pipe segment tubing and exposed by a hole in an outer barrier layer of the pipe segment tubing to facilitate improving tensile strength, hoop strength, or both provided at the break in the solid strip wrap, in which the solid strip wrap and an adjacent solid strip wrap are implemented in the annulus of the pipe segment tubing to define a gap that facilitates improving flexibility of the pipe segment tubing, operating an injection machine in the pipe repair assembly to fill the hole in the outer barrier layer using outer material after the auxiliary patch is secured to the solid strip wrap to facilitate reducing likelihood of the solid strip wrap being subsequently damaged, improving fluid isolation provided by the pipe segment tubing, or both.

In another embodiment, a pipe repair assembly includes an auxiliary patch to be secured at least across a break in a solid strip wrap that is implemented in an annulus of pipe segment tubing and exposed by a hole in an outer barrier layer of the pipe segment tubing to facilitate improving tensile strength, hoop strength, or both provided at the break in the solid strip wrap, and an injection machine. The injection machine fills the hole in the outer barrier layer using outer material after the auxiliary patch is secured to the solid strip wrap to facilitate reducing likelihood of the solid strip wrap being subsequently damaged, improving fluid isolation provided by the pipe segment tubing, or both.

DETAILED DESCRIPTION

Figure 1:
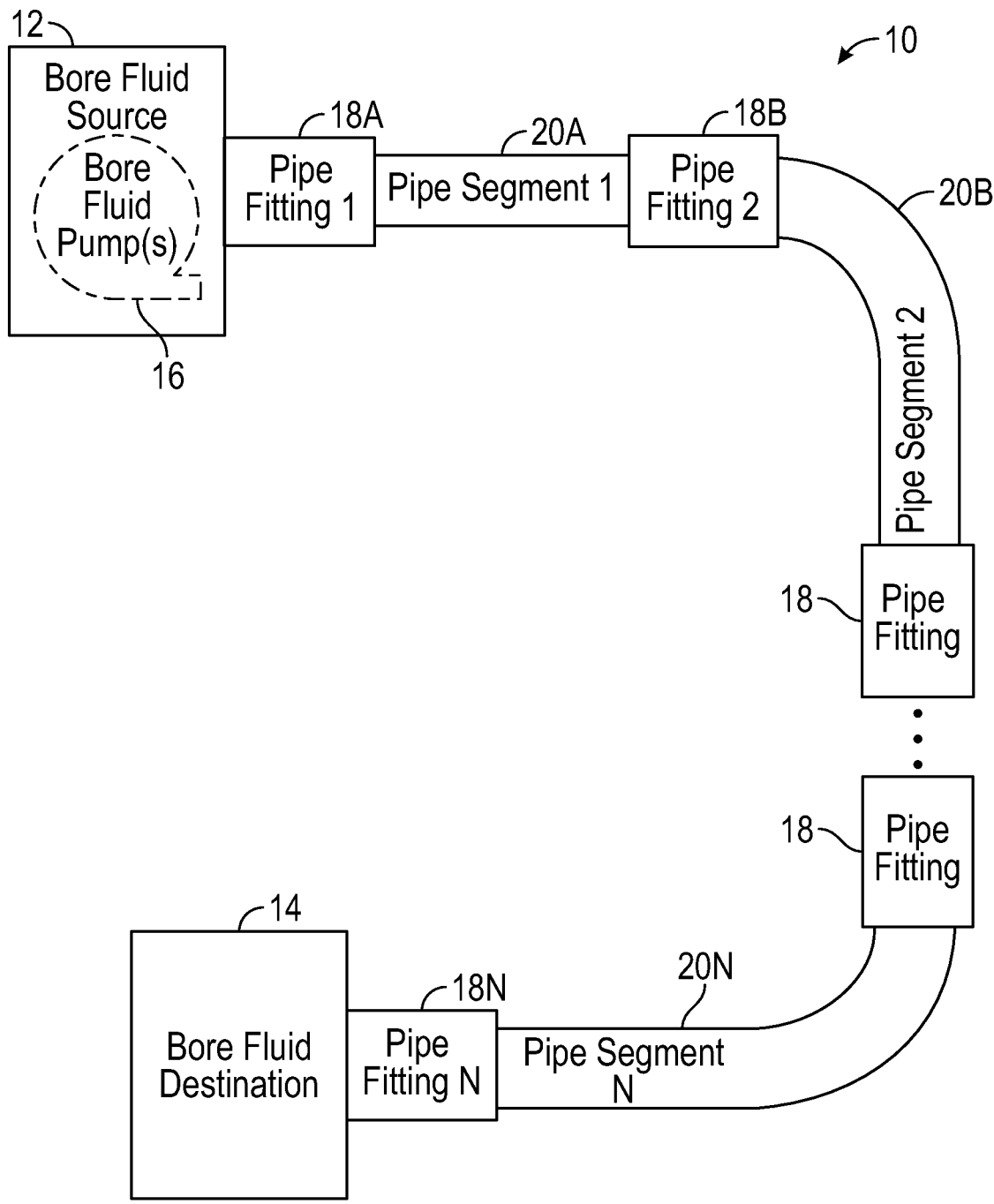
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features.

The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple tubing layers. For example, the tubing of a pipe segment may include an inner barrier (e.g., liner) layer and an outer barrier (e.g., shield and/or sheath) layer that are each implemented to run (e.g., span) the length of the pipe segment. In particular, the internal barrier layer and the outer barrier may each be implemented as a continuous layer of solid material, such as plastic, that runs the length of the pipe segment.

In some instances, the tubing of a pipe segment may additionally include one or more intermediate layers implemented between its inner barrier layer and its outer barrier layer and, thus, in a tubing annulus of the pipe segment. In particular, to facilitate improving its tensile strength and/or its hoop strength, in some instances, the intermediate layers of pipe segment tubing may include one or more reinforcement (e.g., pressure armor and/or tensile armor) layers, which each has one or more solid (e.g., reinforcement) strips that are implemented with material that has a higher tensile strength and/or a higher linear elasticity modulus (e.g., stiffness) than solid material that is used to implement the inner barrier layer and/or the outer barrier layer of the pipe segment tubing. For example, a solid strip in pipe segment tubing may be implemented using metal, such as steel, while the inner barrier layer and the outer barrier layer of the pipe segment tubing are implemented using plastic, such as high-density polyethylene (HDPE).

Additionally, in some embodiments, an intermediate layer in the tubing of a pipe segment may be implemented to define gaps (e.g., free space and/or fluid conduits) within the tubing annulus of the pipe segment, for example, to facilitate improving flexibility of the pipe segment tubing. Merely as an illustrative non-limiting example, an intermediate (e.g., reinforcement) layer may be implemented in pipe segment tubing at least in part by helically wrapping a solid strip around the inner barrier layer of the pipe segment tubing such that gaps are left between adjacent solid strip wraps. Another (e.g., intermediate or outer barrier) layer may then be implemented over the intermediate layer to cover the gaps, thereby defining a helically shaped gap within the annulus of the pipe segment tubing.

Nevertheless, in some instances, the tubing of a pipe segment may be damaged such that its integrity and, thus, its ability to provide isolation (e.g., insulation) between the pipe bore of the pipe segment and environmental conditions external to the pipe segment are affected. For example, a break in a solid strip wrap in the pipe segment tubing may reduce the tensile strength and/or the hoop strength provided by the solid strip wrap and, thus, the ability of the pipe segment tubing to resist further damage to its inner barrier layer and/or its outer barrier layer. Additionally, a hole in the outer barrier layer of the pipe segment tubing may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has integrity-compromising damage may affect (e.g., reduce) operational efficiency and/or operational reliability of the pipeline system, for example, due to the damage resulting in conveyed fluid being lost and/or contaminated by external environmental conditions.

Accordingly, to facilitate improving pipeline operational efficiency and/or pipeline operational reliability, the present disclosure provides techniques for implementing and/or deploying a pipe repair assembly at damaged pipe segment tubing in a pipeline system. As will be described in more detail below, the pipe repair assembly may generally include one or more auxiliary patches, which are implemented to be secured over at least a break in a solid strip wrap in pipe segment tubing, and an injection machine, which is implemented and/or operated to at least inject outer material to facilitate repairing one or more holes in the outer barrier layer of the pipe segment tubing. In particular, in some embodiments, an auxiliary patch in the pipe repair assembly may be implemented using a composite material, such as carbon fiber, and, thus, secured to a solid strip wrap via an adhesive and/or via mechanical fasteners, such as brads, clips, or staples. Additionally or alternatively, an auxiliary patch in the pipe repair assembly may be implemented at least in part using a metal, such as steel, and, thus, secured to a solid strip wrap via a weldment.

Furthermore, in some embodiments, a pipe repair assembly may include a first type of auxiliary patch, which is implemented to be secured to a single solid strip wrap that has a break therein. In particular, in such embodiments, an auxiliary patch of the first type may be secured to the solid strip wrap on either side of the break therein, thereby enabling load (e.g., force) exerted on the solid strip wrap to be transferred across the break and, thus, reducing the effect the break has on the tensile strength and/or the hoop strength provided by the solid strip wrap. Additionally or alternatively, a pipe repair apparatus may include a second type of auxiliary patch, which is implemented to be secured to a solid strip wrap that has a break therein as well as to adjacent solid strip wraps, for example, which do not include breaks therein. In fact, in some embodiments, an auxiliary patch of the second type may enable the auxiliary patch to be implemented using a material that has a lower linear elasticity modulus (e.g., stiffness) as compared to an auxiliary patch of the first type since the load exerted on the damaged solid strip wrap is shared across multiple solid strip wraps.

In any case, after an auxiliary patch is secured to a solid strip wrap in the tubing of a pipe segment, the injection machine in the pipe repair assembly may be operated to inject outer material into a hole in the outer barrier layer of the pipe segment tubing over the auxiliary patch. In particular, in some embodiments, the outer material injected into the hole in the outer barrier layer may generally match the material used to implement the outer barrier layer of the pipe segment tubing. For example, the outer material injected into the hole may be high-density polyethylene (HDPE).

However, as described above, solid strip wraps may be implemented in the tubing of a pipe segment to define gaps (e.g., free space and/or fluid conduits) within the tubing annulus of the pipe segment, for example, to facilitate improving flexibility of the pipe segment tubing. Thus, at least in some instances, liquid outer material injected into a hole in the pipe segment tubing, liquid adhesive used to secure an auxiliary patch to a solid strip wrap, and/or molten metal used to weld an auxiliary patch to a solid strip wrap may inadvertently flow into the gaps defined in the tubing annulus and solidify. In other words, in such instances, the thickness of solid material in the tubing of the pipe segment may inadvertently be increased and/or movement of the strip wraps may inadvertently be blocked, thereby inadvertently reducing flexibility of the pipe segment tubing.

Thus, to facilitate maintaining pipe flexibility, in some embodiments, the injection machine in a pipe repair assembly may additionally be implemented and/or operated to inject filler material into portions of gaps that are defined in the annulus of the pipe segment tubing and exposed by a hole in the outer barrier layer of the pipe segment tubing. In particular, the filler material may generally be a material, which when solid, is less rigid than solid outer material, solid adhesive, and/or solid metal. For example, the filler material may be polyurethane foam. Additionally or alternatively, to facilitate maintaining pipe flexibility, in some embodiments, manufacturing tape may be implemented over an auxiliary patch in a pipe repair assembly before the injection machine injects outer material into a hole in the outer barrier layer of the pipe segment tubing. In this manner, a pipe repair assembly may be deployed at a pipe segment tubing in a pipeline system to facilitate repairing damage to the pipe segment tubing, which, at least in some instances, may facilitate improving operational efficiency and/or operational reliability of the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different tubing layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define one or more gaps (e.g., openings and/or free space) devoid of solid material in its annulus. In fact, in some embodiments, a gap in the tubing annulus of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
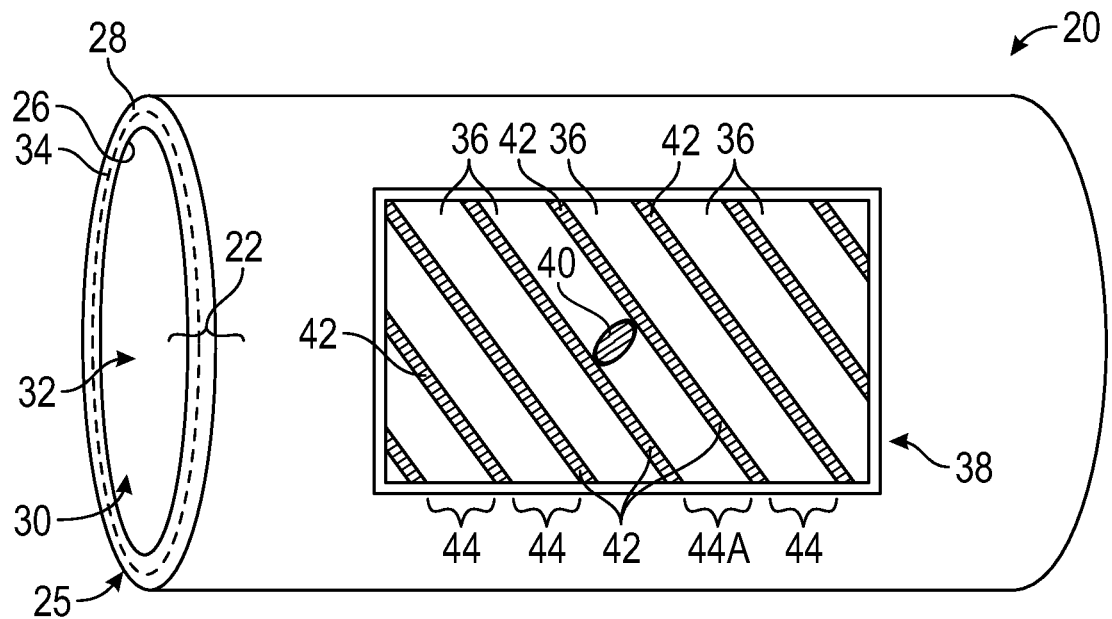
FIG. 2 is a side view of an example of a damaged pipe segment that includes multiple tubing layers, in accordance with an embodiment of the present disclosure.

To help illustrate, an example of a pipe segment 20, which may be deployed in a pipeline system 10, is shown in FIG. 2. As depicted, tubing 22 of the pipe segment 20 is implemented with multiple tubing layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner barrier layer 26 defines (e.g., encloses) a pipe bore 32 through which fluid can flow through the pipe segment 20, for example, to facilitate transporting the fluid from the bore fluid source 12 to the bore fluid destination 14.

Additionally, as in the depicted example, one more intermediate (e.g., reinforcement) layers 34 may be implemented between the inner barrier layer 26 and the outer barrier layer 28 of the pipe segment tubing 22 and, thus, in a tubing annulus 25 of the pipe segment 20. Merely for illustrative purposes, the pipe segment tubing 22 is depicted as having damage that includes a hole 38 in its outer barrier layer 28 and a break 40 in a solid strip 36 that is implemented in an intermediate layer 34 of the pipe segment tubing 22. Furthermore, as in the depicted example, in some embodiments, an intermediate layer 34 in pipe segment tubing 22 may be implemented at least in part by helically wrapping (e.g., winding) one or more solid strips 36 helically around an inner (e.g., inner barrier and/or another intermediate) layer of the pipe segment tubing 22 such that gaps 42 are left between adjacent solid strip wraps (e.g., windings) 44. An outer (e.g., outer barrier and/or another intermediate) layer may then be implemented over the intermediate layer 34 to cover the gaps 42, thereby defining a helically shaped fluid conduit (e.g., free space) within the annulus 25 of the pipe segment tubing 22.

Furthermore, in some embodiments, a solid strip 36 included in an intermediate layer 34 of pipe segment tubing 22 may be implemented using material that has a higher tensile strength and/or a higher linear elasticity modulus (e.g., stiffness) as compared to solid material that is used to implement the inner barrier layer 26 and/or the outer barrier layer 28 of the pipe segment tubing 22. For example, the solid strip 36 in the intermediate layer 34 of the pipe segment tubing 22 may be implemented using metal, such as steel, while the inner barrier layer 26 and the outer barrier layer 28 of the pipe segment tubing 22 are implemented using plastic, such as high-density polyethylene (HDPE). In other words, in such embodiments, the intermediate layer 34 that includes the solid strip 36 may be a reinforcement layer that facilitates improving tensile strength and/or hoop strength of the pipe segment tubing 22, for example, at least in part by absorbing tensile forces and/or hoop forces exerted on the pipe segment tubing 22.

However, it should be appreciated that the depicted example is merely intended to be illustrative and not limiting. In particular, in some embodiments, pipe segment tubing 22 may include multiple reinforcement layers. Additionally, as will be described in more detail below, pipe segment tubing 22 may include one or more other types of intermediate layers 34, such as a tape layer.

In any case, a break 40 in a damaged solid strip wrap 44A may generally affect (e.g., reduce) its ability to absorb tensile force and/or hoop force and, thus, the ability of the pipe segment tubing 22 to resist further damage to its inner barrier layer 26 and/or its outer barrier layer 28. Additionally, a hole 38 in the outer barrier layer 28 of pipe segment tubing 22 may generally affect (e.g., reduce) its ability to provide fluid isolation, which, at least in some instances, may affect (e.g., reduce) operational efficiency and/or operational reliability of a pipeline system 10 in which the pipe segment tubing 22 is deployed. Accordingly, to facilitate improving pipeline operational efficiency and/or pipeline operational reliability, the present disclosure provides techniques for implementing and/or deploying a pipe repair assembly at a pipe segment 20 to facilitate repairing damage to the tubing 22 of the pipe segment 20.

Figure 3:
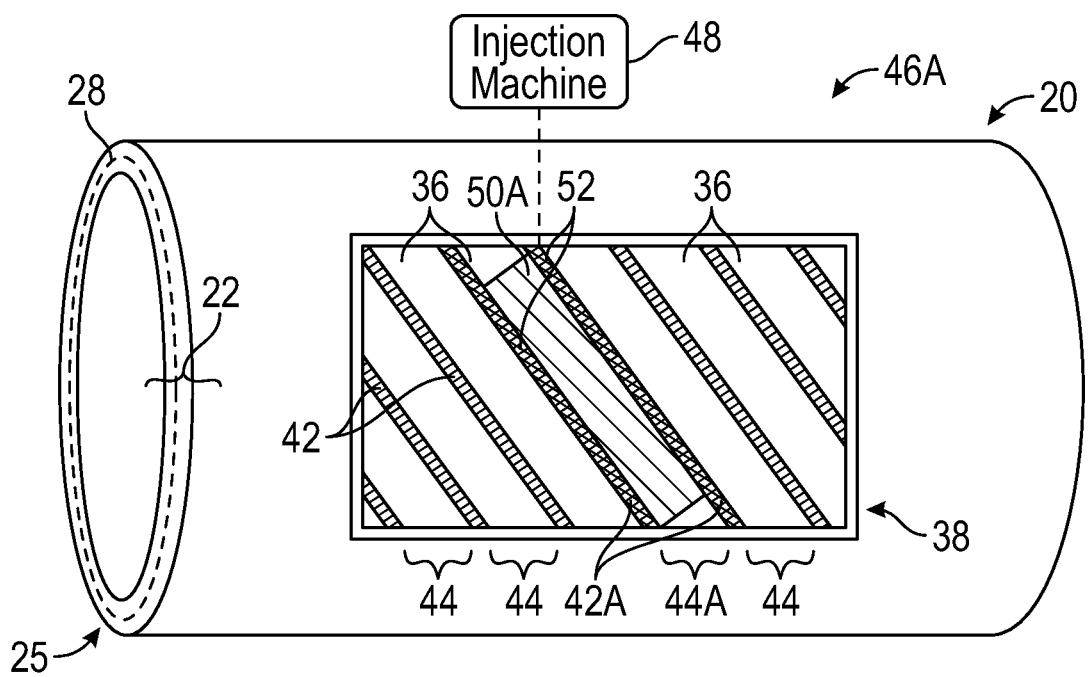
FIG. 3 is a side view of the damaged pipe segment of FIG. 2 and an example of a pipe repair assembly, in accordance with an embodiment of the present disclosure.

To help illustrate, the damaged pipe segment 20 and an example of a pipe repair assembly 46A are shown in FIG. 3. As depicted, the pipe repair assembly 46A generally includes an injection machine 48 and one or more auxiliary patches 50A. In particular, as depicted, an auxiliary patch 50A is secured to a damaged solid strip wrap 44A across a break 40 therein.

In some embodiments, an auxiliary patch 50 in a pipe repair assembly 46 may be implemented at least in part using composite material, such as carbon fiber or synthetic fiber. Thus, in some such embodiments, the auxiliary patch 50 may be secured to a solid strip 36 in the tubing 22 of a pipe segment 20 via an adhesive and/or via mechanical fasteners, such as brads, clips, or staples. Additionally or alternatively, an auxiliary patch 50 in a pipe repair assembly 46 may be implemented at least in part using metal, such as steel fiber. Thus, in some such embodiments, the auxiliary patch 50 may be secured to a solid strip 36 in the tubing 22 of a pipe segment 20 via a weldment.

In any case, as depicted, gaps (e.g., free space and/or fluid conduits) 42 are defined between adjacent solid strip wraps 44 in the tubing 22 of the pipe segment 20, for example, to facilitate improving flexibility of the pipe segment tubing 22 at least in part by enabling the solid strip wraps 44 to move relative to one another. However, in some instances, fluid, such as liquid adhesive and/or molten metal, that is used to secure an auxiliary patch 50 to a solid strip 36 may inadvertently flow into adjacent gaps 42A that are defined in the tubing annulus 25 of the pipe segment 20. In other words, if the fluid is allowed to solidify, this may result in the thickness of solid material in the pipe segment tubing 22 inadvertently being increased and/or movement of one or more solid strip wraps 44 in the pipe segment tubing 22 inadvertently being blocked and, thus, flexibility of the pipe segment tubing 22 inadvertently being reduced.

Thus, to facilitate maintaining pipe flexibility, as in the depicted example, in some embodiments, the injection machine 48 in a pipe repair assembly 46 may be operated to dispose (e.g., inject) filler material 52 in at least the portions of the gaps 42 that are directly adjacent to the location at which an auxiliary patch 50 is to be secured to a solid strip wrap 44. In particular, in some such embodiments, the injection machine 48 may inject liquid filler material 52 into the adjacent gaps 42A and, thus, after solidifying, solid filler material 52 may fill at least the portions of the adjacent gaps 42A that are directly adjacent to the location at which the auxiliary patch 50 is to be secured. Additionally, the filler material 52 may generally be a material, which when solid, is less rigid than solid material, such as solid adhesive and/or solid metal, that results from securement of an auxiliary patch 50 to a solid strip 36 in the pipe segment 20. For example, the filler material 52 may be polyurethane foam.

However, it should be appreciated that the depicted example is merely intended to be illustrative and not limiting. In particular, in other embodiments, a pipe repair assembly 46 may not include filler material 52, for example, when the pipe repair assembly 46 includes manufacturing tape that is to be disposed over an auxiliary patch 50 secured in pipe segment tubing 22 before outer material is disposed to fill a hole 38 in the outer barrier layer 28 of the pipe segment tubing 22. Alternatively, in other embodiments, an injection machine 48 in a pipe repair assembly may be operated to additionally dispose filler material 52 in exposed portions of one or more gaps 42 defined in the tubing annulus 25 of pipe segment that are not directly adjacent to the location at which an auxiliary patch 50 is to be secured. Furthermore, in other embodiments, an auxiliary patch 50 in a pipe repair assembly 46 may be implemented to be secured to a damaged solid strip wrap 44A as well as one or more other (e.g., undamaged) solid strip wraps 44 that are adjacent to the damaged solid strip wrap 44A.

Figure 4:
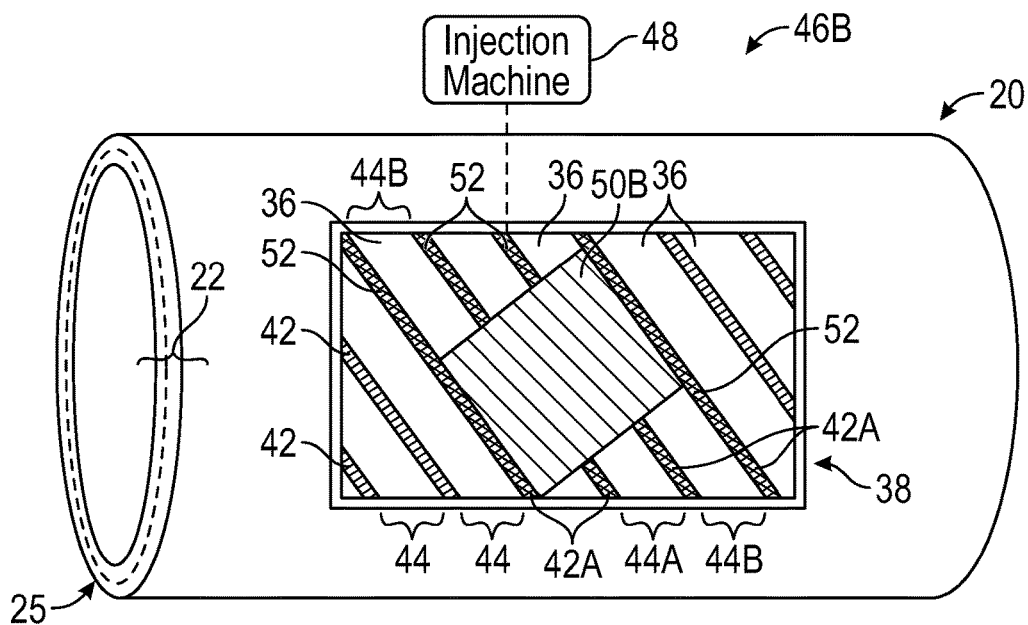
FIG. 4 is a side view of the damaged pipe segment of FIG. 2 and another example of a pipe repair assembly, in accordance with an embodiment of the present disclosure.

To help illustrate, the damaged pipe segment 20 and another example of a pipe repair assembly 46B are shown in FIG. 4. Similar to FIG. 3, as depicted in FIG. 4, the pipe repair assembly 46B generally includes an injection machine 48 and one or more auxiliary patches 50B, which are implemented to be secured at least across a break 40 in a damaged solid strip wrap 44A. In fact, similar to the auxiliary patch 50A of FIG. 3, in some embodiments, the auxiliary patch 50B of FIG. 4 may be implemented at least in part using composite material, such as carbon fiber, and, thus, secured to a solid strip wrap 44 via an adhesive. Additionally or alternatively, similar to the auxiliary patch 50A of FIG. 3, in some embodiments, the auxiliary patch 50B of FIG. 4 may be implemented at least in part using metal, such as steel fiber, and, thus, secured to a solid strip wrap 44 via a weldment.

However, as depicted in FIG. 4, the auxiliary patch 50B is secured to the damaged solid strip wrap 44A as well as to solid strip wraps 44 that are adjacent to the damaged solid strip wrap 44A. In particular, as in the depicted example, in some embodiments, the adjacent solid strip wraps 44 to which the auxiliary patch 50 is secured may be undamaged solid strip wraps 44B. In other words, FIG. 3 describes a first type of auxiliary patch 50A that is implemented to be secured to a single (e.g., damaged) solid strip wrap 44 and, thus, to compensate for the tensile strength and/or the hoop strength lost due to a break 40 in the solid strip wrap 44 by increasing the tensile strength and/or the hoop strength over the break 40. On the other hand, FIG. 4 describes a second type of auxiliary patch 50B that is implemented to be secured to multiple solid strip wraps 44 and, thus, to compensate for the tensile strength and/or the hoop strength lost due to a break 40 in one or more of the solid strip wraps 44 by increasing tensile strength and/or hoop strength over the break 40 as well as sharing the load placed on the break 40 with adjacent (e.g., undamaged) solid strip wraps 44.

Nevertheless, in some embodiments, a pipe repair assembly 46 may include one or more auxiliary patches 50A of the first type and one or more auxiliary patches 50B of the second type. In particular, in some such embodiments, an auxiliary patch 50A of the first type may be implemented with material that has a higher linear elasticity modulus to facilitate reducing the likelihood of overloading undamaged solid strip wraps 44 that are adjacent to a damaged solid strip wrap 44A to which the auxiliary patch 50A is secured. On the other hand, an auxiliary patch 50B of the second type may be implemented with a material that has a lower linear elasticity modulus since the increased amount of material in the auxiliary patch 50B may facilitate compensating for the resulting load (e.g., stress) that is placed on undamaged solid strip wraps 44B to which the auxiliary patch 50B is secured.

In any case, as depicted, gaps (e.g., free space and/or fluid conduits) 42 are defined between adjacent solid strip wraps 44 included in the tubing 22 of the pipe segment 20, for example, to facilitate improving flexibility of the pipe segment tubing 22 at least in part by enabling the solid strip wraps 44 to move relative to one another. In fact, similar to FIG. 4, in some instances, fluid, such as liquid adhesive and/or molten metal, that is used to secure an auxiliary patch 50 to a solid strip 36 may inadvertently flow into adjacent gaps 42A that are defined in the tubing annulus 25 of the pipe segment 20. In other words, if the fluid is allowed to solidify, this may result in the thickness of solid material in the pipe segment tubing 22 inadvertently being increased and/or movement of one or more solid strip wraps 44 in the pipe segment tubing inadvertently being blocked and, thus, flexibility of the pipe segment tubing 22 inadvertently being reduced.

Thus, to facilitate maintaining pipe flexibility, as in the depicted example, in some embodiments, the injection machine 48 in a pipe repair assembly 46 may be operated to dispose (e.g., inject) filler material 52 in at least the portions of the gaps 42 that are directly adjacent to the location at which an auxiliary patch 50 is to be secured to a solid strip wrap 44. In particular, in some such embodiments, the injection machine 48 may inject liquid filler material 52 into the adjacent gaps 42A and, thus, after solidifying, solid filler material 52 may fill at least the portions of the adjacent gaps 42A that are directly adjacent to the location at which the auxiliary patch 50 is to be secured. Additionally, the filler material 52 may generally be a material, which when solid, is less rigid than solid material, such as solid adhesive and/or solid metal, that results from securement of an auxiliary patch 50 to a solid strip 36 in the pipe segment 20. For example, the filler material 52 may be polyurethane foam.

However, it should be appreciated that the depicted example is merely intended to be illustrative. In particular, in other embodiments, an auxiliary patch 50B of the second type may be implemented to be secured to a damaged solid strip wrap 44A and a single undamaged solid strip wrap 44B. Additionally, in other embodiments, an auxiliary patch 50B of the second type may be implemented to be secured across breaks 40 in multiple adjacent damaged solid strip wraps 44A. In any case, after an auxiliary patch 50 is secured to one or more solid strip wraps 44 in an intermediate layer 34 of pipe segment tubing 22, the injection machine 48 in a pipe repair assembly 46 may be operated to fill a hole 38 in the outer barrier layer 28 of the pipe segment tubing 22 that exposes the one or more solid strip wraps 44, for example, to facilitate reducing the likelihood of the one or more solid strip wraps 44 being further damaged and/or improving fluid isolation provided by the pipe segment tubing 22.

Figure 5:
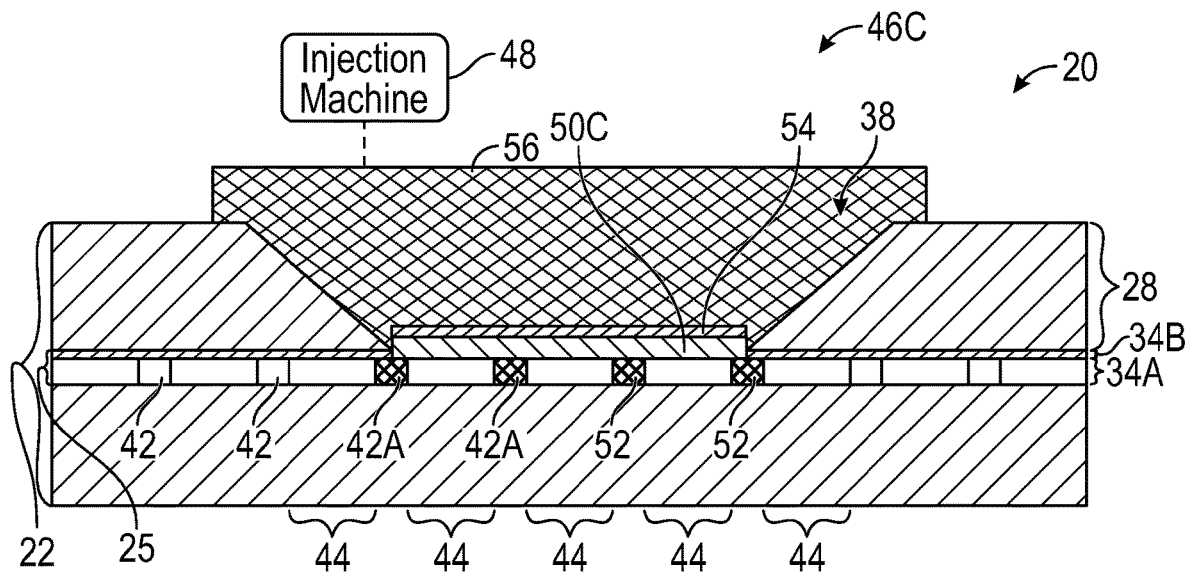
FIG. 5 is a cross-sectional view of the damaged pipe segment of FIG. 2 and a further example of a pipe repair assembly, in accordance with an embodiment of the present disclosure.

To help illustrate, the damaged pipe segment 20 and a further example of a pipe repair assembly 46C are shown in FIG. 5. Similar to FIG. 4, as depicted in FIG. 5, the pipe repair assembly 46C generally includes an injection machine 48 and an auxiliary patch 50C. In particular, similar to FIG. 4, as depicted in FIG. 5, the auxiliary patch 50C is secured across multiple solid strip wraps 44 that are implemented in the tubing annulus 25 of the pipe segment 20. In fact, in some embodiments, the auxiliary patch 50C of FIG. 5 may generally match the auxiliary patch of FIG. 4.

In any case, as depicted in FIG. 5, manufacturing tape 54 is disposed over the auxiliary patch 50C. In particular, as in the depicted example, in some embodiments, the manufacturing tape 54 may be implemented to span the area of a hole 38 in the outer barrier layer 28 of the pipe segment tubing 22. In other words, in such embodiments, the manufacturing tape 54 may facilitate blocking material from entering gaps (e.g., free space and/or fluid conduits) 42 defined in the tubing annulus 25 of the pipe segment 20, for example, in addition or as an alternative to filler material 52 disposed in exposed portions of the gaps 42. Moreover, as in the depicted example, in some embodiments, the intermediate layers 34 in the tubing annulus 25 of a pipe segment 20 may include a first intermediate layer 34A—namely a reinforcement layer 34A—implemented using solid strip wraps 42 as well as a second intermediate layer 34B—namely a tape layer 34B—implemented between the reinforcement layer 34A and the outer barrier layer 28 of the pipe segment 20. In particular, in such embodiments, the tape layer 34B may facilitate reducing the likelihood of solid material resulting from formation of the outer barrier layer 28 around the tubing annulus 25 of the pipe segment 20 inadvertently filling gaps 42 defined in the tubing annulus 25.

However, it should be appreciated that the depicted example is merely intended to be illustrative and not limiting. In particular, in other embodiments, the tubing 22 of a pipe segment 20 may not include a tape layer 34B. Additionally, in other embodiments, the tubing annulus 25 of a pipe segment 20 may include multiple reinforcement layers 34A implemented using solid strip wraps 44. Furthermore, in other embodiments, manufacturing tape 54 may not be disposed over an auxiliary patch 50 securing a solid strip wrap 44 in pipe segment tubing 22, for example, when filler material 52 is disposed within each exposed portion of a gap (e.g., fluid conduit and/or free space) defined in the annulus 25 of the pipe segment tubing 22.

In any case, as depicted, after the auxiliary patch 50C is secured to the solid strip wraps 44, the injection machine 48 may be operated to dispose (e.g., inject) outer material 56 to fill the hole 38 in the outer barrier layer 28 of the pipe segment 20. In particular, in some embodiments, the outer material 56 may generally match the material used to implement the outer barrier layer 28. For example, the outer material 56 may be high-density polyethylene (HDPE). Additionally, to facilitate filling the hole 38, in some embodiments, the injection machine 48 may inject liquid outer material 56 into the hole 38 in the outer barrier layer 28 such that, after solidifying, solid outer material 56 is secured to the outer barrier layer 28.

To facilitate securement of outer material 56 thereto, in some embodiments, the outer barrier layer 28 of a pipe segment 20 may be processed before outer material 56 is disposed in a hole 38 therein. For example, a portion of the outer barrier layer 28 adjacent to the hole 38 may be machined (e.g., roughed up) before outer material 56 is disposed in the hole 38. Additionally or alternatively, a portion of the outer barrier layer 28 adjacent to the hole 38 may be plasma treated before outer material 56 is disposed in the hole 38.

However, it should again be appreciated that the depicted example is merely intended to be illustrative and not limiting. In particular, as will be described in more detail below, in some embodiments, outer material 56 disposed within a hole 38 in the outer barrier layer 28 of a pipe segment 20 may be machined such that the outer material 56 is flush with the remaining outer barrier layer 28, for example, to facilitate reducing thickness of the pipe segment tubing 22 at the hole 38 and, thus, maintaining flexibility of the pipe segment 20. In any case, in this manner, a pipe repair assembly 46 may be deployed at a pipe segment 20 in a pipeline system 10 to facilitate repairing damage to the tubing 22 of the pipe segment 20 while maintaining flexibility of the pipe segment 20, which, at least in some instances, may facilitate improving operational reliability and/or operational efficiency of the pipeline system 10.

Figure 6:
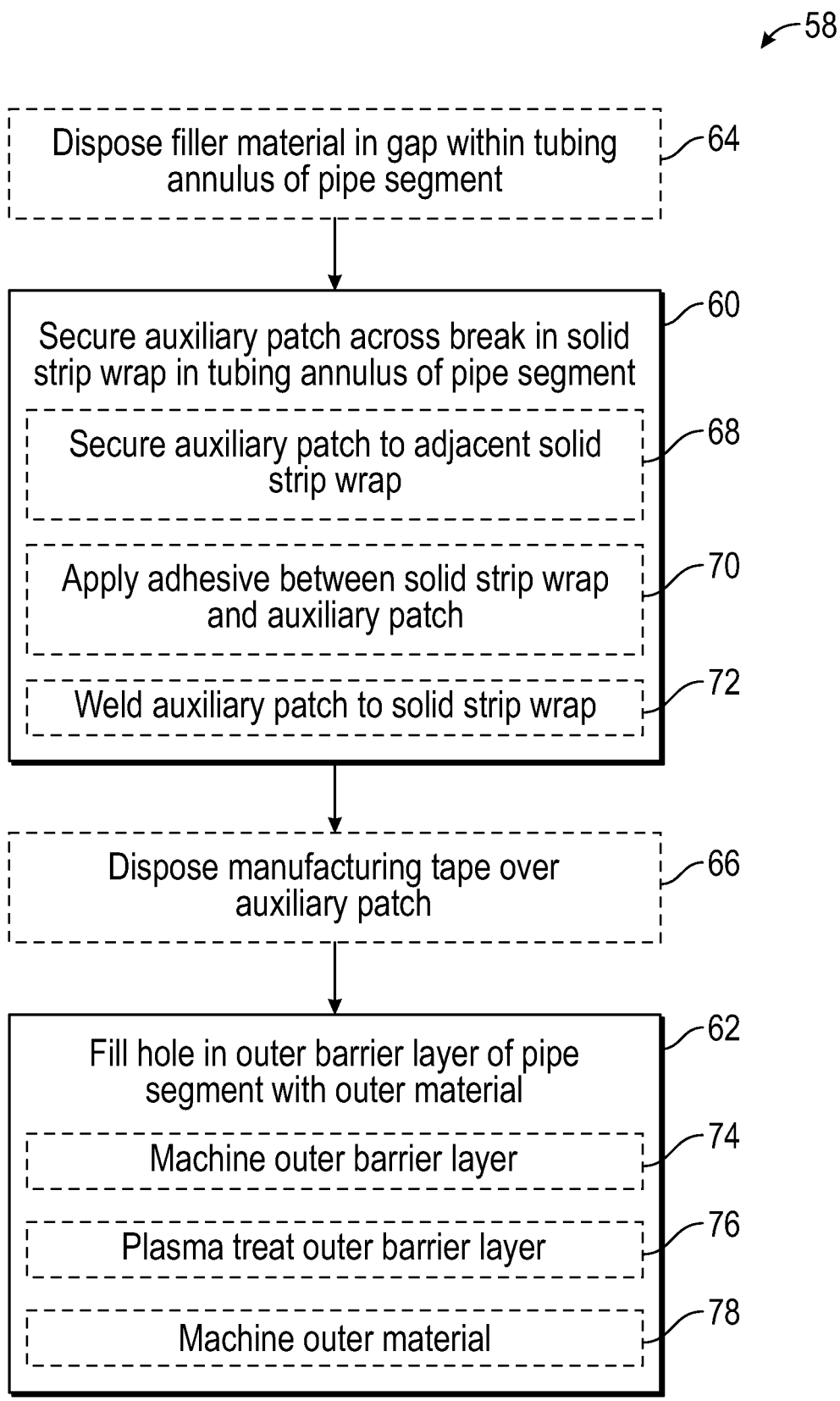
FIG. 6 is a flow diagram of an example of a process for deploying a pipe repair assembly in a pipeline system, in accordance with an embodiment of the present disclosure.

To help further illustrate, an example of a process 58 for deploying a pipe repair assembly 46 at a pipe segment 20 is described in FIG. 6. Generally, the process 58 includes securing an auxiliary patch across a break in a solid strip wrap in a tubing annulus of a pipe segment (process block 60). Additionally, the process 58 generally includes filling a hole in an outer barrier layer of the pipe segment with outer material (process block 62).

Although described in a specific order, which corresponds with an embodiment of the present disclosure, it should be appreciated that the example process 58 is merely intended to be illustrative and not limiting. In particular, in other embodiments, a process 58 for deploying a pipe repair assembly 46 at a pipe segment 20 may include one or more additional process blocks and/or omit one or more of the depicted process blocks. For example, some embodiments of the process 58 may additionally include disposing filler material in a gap within the tubing annulus of the pipe segment (process block 64) while other embodiments of the process 58 do not. As another example, some embodiments of the process 58 may additionally include disposing manufacturing tape over the auxiliary patch (process block 66) while other embodiments of the process 58 do not.

In any case, as described above, a pipe repair assembly 46 generally includes one or more auxiliary patches 50. In particular, as described above, an auxiliary patch 50 may be implemented to be secured at least across a break 40 in a solid strip wrap 44 that is included in a tubing annulus 25 of a pipe segment 20 and exposed by a hole 38 in the outer barrier layer 28 of the pipe segment 20. As such, deploying a pipe repair assembly 46 at a pipe segment 20 may include securing an auxiliary patch 50 to a solid strip wrap 44 included in the tubing annulus 25 of the pipe segment 20 such that auxiliary patch 50 bridges (e.g., spans across) a break 40 in the solid strip wrap 44 (process block 60).

In addition to a damaged solid strip wrap 44A, as described above, in some embodiments, an auxiliary patch 50 in a pipe repair assembly 46 may be implemented to also be secured to one or more other solid strip wraps 44 that are adjacent to the damaged solid strip wrap 44A. In other words, in such embodiments, securing the auxiliary patch 50 may additionally include securing the auxiliary patch 50 to one or more solid strip wraps 44 that are adjacent to the damaged solid strip wrap 44A (process block 68). In particular, as described above, in some such embodiments, the auxiliary patch 50 may be secured to a damaged solid strip wrap 44A as well as to one or more undamaged solids strip wraps 44B that are adjacent to the damaged solid strip wrap 44A. Nevertheless, in other such embodiments, the auxiliary patch 50 may be secured to multiple adjacent damaged solid strip wraps 44A.

In any case, as described above, in some embodiments, an auxiliary patch 50 in a pipe repair assembly 46 may be secured to a solid strip wrap 44 in the tubing annulus 25 of a pipe segment 20 via an adhesive. In other words, in such embodiments, securing the auxiliary patch 50 to a solid strip wrap 44 may include applying an adhesive between the solid strip wrap 44 and the auxiliary patch 50 (process block 70). Additionally, as described above, in other embodiments, an auxiliary patch 50 in a pipe repair assembly 46 may be secured to a solid strip wrap 44 in the tubing annulus 25 of a pipe segment 20 via a weldment. In other words, in such embodiments, securing the auxiliary patch 50 to a solid strip wrap 44 may include welding the auxiliary patch 50 to the solid strip wrap 44 (process block 72).

However, as described above, solid strip wraps 44 may be implemented in pipe segment tubing 22 such that gaps (e.g., fluid conduits and/or free space) 42 are defined between adjacent solid strip wraps 44 to facilitate improving flexibility of the pipe segment tubing 22. Additionally, as mentioned above, fluid, such as liquid adhesive and/or molten metal, may be used to secure an auxiliary patch 50 to a solid strip wrap 44. In fact, as described above, in some instances, the fluid that is used to secure the auxiliary patch 50 to the solid strip wrap 44 may flow inadvertently into adjacent gaps 42A defined in the tubing annulus 25 of the pipe segment 20. In other words, if the fluid is allowed to solidify, this may result in the thickness of solid material in the tubing 22 of the pipe segment 20 inadvertently being increased and/or movement of one or more solid strip wraps 44 inadvertently being blocked and, thus, flexibility of the pipe segment 20 inadvertently being reduced.

Accordingly, as described above, to facilitate maintaining pipe flexibility, in some embodiments, an injection machine 48 in a pipe repair assembly 46 may be operated to dispose filler material 52 into one or more gaps 42 defined in the tubing annulus 25 of a pipe segment 20 before an auxiliary patch 50 in the pipe repair assembly 46 is secured to a solid strip wrap 44 included in the tubing annulus 25. In other words, in such embodiments, deploying the pipe repair assembly 46 at a pipe segment 20 may include disposing filler material 52 into one or more gaps 42 defined in the tubing annulus 25 of the pipe segment 20 (process block 64). In particular, as described above, in some such embodiments, the injection machine 48 may be operated to inject liquid filler material 52 into the adjacent gaps 42A and, thus, after solidifying, solid filler material 52 may fill at least the portions of the adjacent gaps 42A that are directly adjacent to the location at which the auxiliary patch 50 is to be secured. Additionally, as described above, the filler material 52 may generally be a material, which when solid, is less rigid than solid material, such as solid adhesive and/or solid metal, that results from the securement of the auxiliary patch 50 to the solid strip 36 in the pipe segment 20. For example, the filler material 52 may be polyurethane foam.

In any case, after the auxiliary patch 50 is secured, an injection machine 48 in the pipe repair assembly 46 may be operated to fill the hole 38 in the outer barrier layer 28 of the pipe segment 20 with outer material 56 (process block 62). As described above, in some embodiments, the outer material 56 disposed in the hole 38 may generally match the material used to implement the outer barrier layer 28. For example, the outer material 56 may be high-density polyethylene (HDPE).

Additionally, as described above, to facilitate improving securement of the outer material 56 thereto, in some embodiments, the outer barrier layer 28 of a pipe segment 20 may be processed before outer material 56 is disposed within a hole 38 therein. In particular, as described above, in some such embodiments, filling the hole 38 in the outer barrier layer 28 may include machining (e.g., roughing up) the portion of the outer barrier layer 28 surrounding the hole 38 before disposing outer material 56 in the hole 38 (process block 74). Additionally or alternatively, as described above, filling the hole 38 in the outer barrier layer 28 may include plasma treating the portion of the outer barrier layer 28 surrounding the hole 38 before disposing outer material 56 in the hole 38 (process block 76).

Furthermore, as described above, to facilitate filling the hole 38 in the outer barrier layer 28, in some embodiments, the injection machine 48 may inject liquid outer material 56 into the hole 38 such that, after solidifying, solid outer material 56 is secured to the outer barrier layer 28. Moreover, as described above, to facilitate maintaining flexibility of the pipe segment 20, in some embodiments, solid outer material 56 may be machined (e.g., filed) to remove excess material, for example, such that the remaining outer material 56 is substantially flush with the remaining the outer barrier layer 28 (process block 78). However, as described above, solid strip wraps 44 may be implemented in pipe segment tubing 22 such that gaps (e.g., fluid conduits and/or free space) 42 are defined between adjacent solid strip wraps 44 to facilitate improving flexibility of the pipe segment tubing 22 and, thus, at least in some instances, liquid outer material 56 may flow into and solidify within the gaps 42, thereby inadvertently increasing the thickness of solid material in the pipe segment tubing 22 and/or inadvertently blocking movement of one or more solid strip wraps 44 within the pipe segment tubing 22.

Accordingly, as described above, to facilitate maintaining pipe flexibility, in some embodiments, manufacturing tape 54 may be disposed over the auxiliary patch 50 before the outer material 56 is used to fill the hole 38 in the outer barrier layer 28 of the pipe segment 20 (process block 66). In particular, as described above, to facilitate blocking liquid outer material 56 from entering gaps 42 defined in the tubing annulus 25 of the pipe segment 20, in some embodiments, the manufacturing tape 54 may be disposed such that it spans the area of the hole 38 in the outer barrier layer 28. In fact, in some embodiments, the manufacturing tape 54 disposed over the auxiliary patch 50 may generally match manufacturing tape 54 included in an intermediate tape layer 34B in the tubing 22 of the pipe segment 20. In this manner, a pipe repair assembly 46 may be deployed at a pipe segment 20 in a pipeline system 10 to facilitate repairing damage to the tubing 22 of the pipe segment 20 while maintaining flexibility of the pipe segment 20, which, at least in some instances, may facilitate improving operational reliability and/or operational efficiency of the pipeline system 10.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:
1. A pipeline system, comprising:
   a pipe segment, wherein the pipe segment comprises tubing having:

an inner barrier layer that defines a pipe bore through the pipe segment;

an intermediate layer comprising a plurality of solid strip wraps implemented around the inner barrier layer such that gaps are defined between adjacent solid strip wraps; and an outer barrier layer implemented around the intermediate layer; and a pipe repair assembly comprising:

an auxiliary patch secured at least across a break in a solid strip wrap in the plurality of solid strip wraps in the intermediate layer of the pipe segment, wherein the break in the solid strip wrap is exposed by a hole in the outer barrier layer of the pipe segment before the hole is filled;

filler material disposed via an injection machine in portions of the gaps defined in the intermediate layer of the pipe segment before the auxiliary patch is secured to the solid strip wrap in the plurality of solid strip wraps that comprises the break, wherein the portions of the gaps defined in the intermediate layer of the pipe segment are exposed by the hole in the outer barrier layer of the pipe segment before the hole is filled; and outer material disposed over the auxiliary patch via the injection machine to fill the hole in the outer barrier layer of the pipe segment.

2. The pipeline system of claim 1, wherein the filler material is configured to block liquid adhesive or molten metal used to secure the auxiliary patch to the solid strip wrap in the plurality of solid strip wraps that comprises the break from flowing into the gaps defined in the intermediate layer of the pipe segment.

3. The pipeline system of claim 1, wherein the filler material comprises polyurethane foam.

4. The pipeline system of claim 1, wherein the auxiliary patch is secured to another solid strip wrap in the plurality of solid strip wraps in the intermediate layer of the pipe segment that is adjacent to the solid strip wrap in the plurality of solid strip wraps that comprises the break.

5. The pipeline system of claim 1, wherein the pipe repair assembly comprises manufacturing tape disposed over the auxiliary patch before the outer material is used to fill the hole in the outer barrier layer of the pipe segment.

6. The pipeline system of claim 5, wherein the manufacturing tape is disposed over the auxiliary patch such that the manufacturing tape spans an area of the hole in the outer barrier layer to facilitate blocking liquid outer material from flowing into the gaps defined in the intermediate layer of the pipe segment.

7. The pipeline system of claim 5, wherein the tubing of the pipe segment comprises a tape layer implemented between the intermediate layer and the outer barrier layer.

8. A method of deploying a pipe repair assembly at pipe segment tubing, comprising:

securing an auxiliary patch in the pipe repair assembly across at least a break in a solid strip wrap that is implemented in an annulus of the pipe segment tubing and exposed by a hole in an outer barrier layer of the pipe segment tubing to facilitate improving tensile strength, hoop strength, or both provided at the break in the solid strip wrap, wherein the solid strip wrap and an adjacent solid strip wrap are implemented in the annulus of the pipe segment tubing to define a gap that facilitates improving flexibility of the pipe segment tubing;

operating an injection machine in the pipe repair assembly to fill the hole in the outer barrier layer using outer material after the auxiliary patch is secured to the solid strip wrap to facilitate reducing likelihood of the solid strip wrap being subsequently damaged, improving fluid isolation provided by the pipe segment tubing, or both; and operating the injection machine to dispose filler material in the gap defined between the solid strip wrap and the adjacent solid strip wrap before the auxiliary patch is secured to the solid strip wrap to facilitate blocking fluid used to secure the auxiliary patch to the solid strip wrap from flowing into the gap defined between the solid strip wrap and the adjacent solid strip wrap.

9. The method of claim 8, comprising disposing manufacturing tape over the auxiliary patch before the injection machine is operated to fill the hole in the outer barrier layer to facilitate blocking liquid outer material from flowing into the gap defined between the solid strip wrap and the adjacent solid strip wrap.

10. The method of claim 8, wherein securing the auxiliary patch to the solid strip wrap comprises:

applying a liquid adhesive between the auxiliary patch and the solid strip wrap;

producing molten metal between the auxiliary patch and the solid strip wrap; or both.

11. The method of claim 8, wherein:

operating the injection machine to dispose the filler material in the gap defined between the solid strip wrap and the adjacent solid strip wrap comprises operating the injection machine to inject polyurethane foam into the gap; and operating the injection machine to fill the hole in the outer barrier layer comprises operating the injection machine to inject high-density polyethylene into the hole.

12. The method of claim 8, comprising machining, plasma treating, or both a portion of the outer barrier layer surrounding the hole before the injection machine is operated to fill the hole using the outer material to facilitate improving securement of the outer material to the outer barrier layer of the pipe segment tubing.

13. The method of claim 8, wherein securing the auxiliary patch comprises securing the auxiliary patch to the solid strip wrap and the adjacent solid strip wrap to facilitate distributing load placed on the solid strip wrap to the adjacent solid strip wrap.

14. A pipe repair assembly comprising:

an auxiliary patch configured to be secured at least across a break in a solid strip wrap that is implemented in an annulus of pipe segment tubing and exposed by a hole in an outer barrier layer of the pipe segment tubing before the hole is filled to facilitate improving tensile strength, hoop strength, or both provided at the break in the solid strip wrap; and an injection machine, wherein the injection machine is configured to:

fill the hole in the outer barrier layer using outer material after the auxiliary patch is secured to the solid strip wrap to facilitate reducing likelihood of the solid strip wrap being subsequently damaged, improving fluid isolation provided by the pipe segment tubing, or both; and dispose filler material within a gap defined between the solid strip wrap and an adjacent solid strip wrap in the annulus of the pipe segment tubing before the auxiliary patch is secured to the solid strip wrap and before the hole is filled to facilitate blocking fluid that is used to secure the auxiliary patch to the solid strip wrap from flowing into the gap.

15. The pipe repair assembly of claim 14, wherein:

the auxiliary patch comprises carbon fiber, steel fiber, or synthetic fiber;

the outer material used to fill the hole in the outer barrier layer of the pipe segment tubing comprises high-density polyethylene; and the filler material disposed within the gap comprises polyurethane foam.

16. The pipe repair assembly of claim 14, comprising manufacturing tape configured to be disposed over the auxiliary patch before the injection machine is operated to fill the hole in the outer barrier layer to facilitate blocking liquid outer material from flowing into the gap defined between the solid strip wrap and the adjacent solid strip wrap in the annulus of the pipe segment tubing.

17. The pipe repair assembly of claim 14, wherein the auxiliary patch is configured to be secured to the solid strip wrap and the adjacent solid strip wrap in the annulus of the pipe segment tubing to facilitate transferring load placed on the break in the solid strip wrap to the adjacent solid strip wrap.

\* \* \* \* \*